3,729,404
PHOTOCURABLE POLYENE-POLYTHIOL POLYMERS USING A PHOSPHINE PLUS AN ADDITIONAL SENSITIZER
Charles Robert Morgan, Silver Spring, Md., assignor to W. R. Grace & Co., New York, N.Y.
No Drawing. Filed Sept. 10, 1971, Ser. No. 179,567
Int. Cl. C08d 1/00; C08f 1/16; C08c 11/54
U.S. Cl. 204—159.15                           6 Claims

ABSTRACT OF THE DISCLOSURE

This invention relates to accelerated curing of a composition comprising a polyene containing at least two reactive unsaturated carbon to carbon bonds per molecule and a polythiol containing at least two thiol groups per molecule, the total combined functionality of (a) the reactive unsaturated carbon to carbon bonds per molecule in the polyene and (b) the thiol groups per molecule in the polythiol being greater than four, in the presence of a photosensitizer and a novel class of synergistic agents from the group consisting of (1) phosphines of the formula $$R_1-\underset{\underset{R_2}{|}}{P}-R_3$$

wherein $R_1$, $R_2$ and $R_3$ are each independently selected from the group consisting of alkyl, aryl, alkaryl and alkoxy and (2) phosphites of the formula $$R_4O-\underset{\underset{R_5O}{|}}{P}-OR_6$$

wherein $R_4$, $R_5$ and $R_6$ are each independently selected from the group consisting of alkyl, aryl and alkaryl, said alkyls containing 1–12 carbon atoms.

The curing takes place in the presence of a free radical generator, preferably actinic radiation, e.g., UV light.

In the adhesive field today, especially when adhering metals, the main adhesive employed is the epoxy class of adhesives. However, the epoxy type adhesives have several drawbacks. One of the main drawbacks is that the curing rate even at elevated temperatures in excess of 250° F. is not rapid enough to make the system commercially feasible. That is, curing times of one hour or more at 250° F. are necessary to obtain a hardened fully cured adhesive.

Recently, we have discovered that polyenes containing at least two unsaturated carbon to carbon bonds per molecule in combination with a polythiol and a photosensitizer can be cured by exposure to actinic radiation. These combinations make admirable adhesive but, of necessity for UV curing, the material to be bonded must be UV transparent. Further work with these compositions without a photosensitizer has shown them to be curable adhesives when heat is applied for extended periods, e.g., 250° F. for one day. Such a curing rate is, however, commercially unacceptable.

One object of the instant invention is to provide a curable composition which can be cured rapidly in the presence of a free radical generator within time periods of less than ½ hour (preferably within one minute). Another object of the instant invention is to provide curable compositions which can be cured at ambient temperatures below 250° F. These and other objects will become apparent from a reading hereinafter.

Summarily, the above and other objects are obtained by forming a curable composition comprising a polyene containing at least two reactive unsaturated carbon to carbon bonds per molecule, a polythiol containing at least two thiol groups per molecule, the total combined functionality of (2) the unsaturated carbon to carbon bonds per molecule in the polyene and (b) the thiol groups per molecule in the polythiol being greater than four, a photosensitizer and a synergistic agent from the group consisting of (1) phosphines of the formula $$R_1-\underset{\underset{R_2}{|}}{P}-R_3$$

wherein $R_1$, $R_2$ and $R_3$ are each independently selected from the group consisting of alkyl, aryl, alkaryl and alkoxy and (2) phosphites of the formula $$R_4O-\underset{\underset{R_5O}{|}}{P}-OR_6$$

wherein $R_4$, $R_5$ and $R_6$ are each independently selected from the group consisting of alkyl, aryl and alkaryl, said alkyls containing 1–12 carbon atoms.

For the purpose of brevity, the group members of operable phosphine and phosphite synergistic agents will hereinafter be referred to as synergistic agents.

Examples of phosphines and phosphites which are operable in the instant invention include, but are not limited to:

trimethylphosphine,
tris(chloromethyl)phosphine,
tris(2-hydroxyethyl)phosphine,
tris(2-hydroxypropyl)phosphine,
triallylphosphine,
triisopropylphosphine,
tri-n-octylphosphine,
tridodecylphosphine,
triphenylphosphine,
tris(2-chlorophenyl)phosphine,
tris(2-methoxyphenyl)phosphine,
tri-o-tolylphosphine,
methoxydiphenylphosphine,
di-n-butoxyphenylphosphine,
diphenyl-p-tolyphosphine,
n-butoxydiphenylphosphine,
tris(2,4,5-trimethylphenyl)phosphine,
ethylenebis(diphenylphosphine),
dimethylphenylphosphine,
diethylisoamylphosphine,
diisobutylphenylphosphine,
tris(trichloromethyl)phosphine,
trimethyl phosphite,
triethyl phosphite,
diethyl-2-chloroethyl phosphite,
tris(2-chloroethyl) phosphite,
tris(2-methoxyethyl) phosphite,
tri-n-propyl phosphite,
tri-isoctyl phosphite,
phenyl-bis (2-chloroethyl) phosphite,
triphenyl phosphite,
tri-p-tolyl phosphite,
triallyl phosphite,
tris(2-methoxyphenyl) phosphite and
tridodecyl phosphite.

The polythiols and one group of operable polyenes which can be cured rapidly are set out in a Canadian patent assigned to the same assignee having Pat. No. 853,790 issued Oct. 13, 1970 and are incorporated herein by reference. That is, one group of polyenes operable in the instant invention are those having a molecular weight in the range 300 to 20,000, a viscosity ranging from 0–20 million centipoises at 70° C. of the general formula $[A]\text{-}(X)_m$ wherein X is a member of the group consisting of

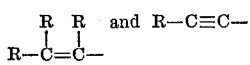

$m$ is at least 2; R is independently selected from the group consisting of hydrogen, halogen, aryl, substituted aryl, cycloalkyl, substituted cycloalkyl, aralkyl, substituted aralkyl and alkyl and substituted alkyl groups containing 1–16 carbon atoms and A is a polyvalent organic moiety free of (1) reactive carbon to carbon unsaturation and (2) unsaturated groups in conjunction with the reactive ene or yne groups in X. Thus A may contain cyclic groupings and minor amounts of hetero atoms such as N, S or O but contains primarily carbon-carbon, carbon-oxygen or silicon-oxygen containing chain linkages without any reactive carbon to carbon unsaturation.

Examples of said operable polyenes include, but are not limited to:

(1) Crotyl-terminated polyurethanes which contain two "reactive" double bonds per average molecule in a near terminal position of the average general formula:

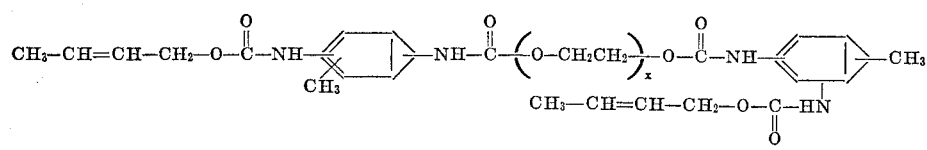

wherein $x$ is at least 1, (2) Ethylene/propylene/non-conjugated diene terpolymers, such as "Nordel 1040" manufactured by Du Pont which contains pendant "reactive" double bonds of the formula:

$$-CH_2-CH=CH-CH_2$$

(3) The following structure which contains terminal "reactive" double bonds:

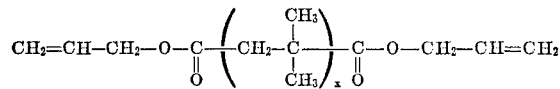

where $x$ is at least 1, (4) The following structure which contains near terminal "reactive" double bonds

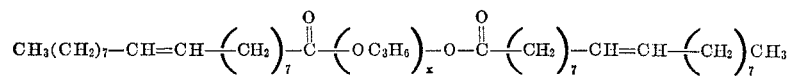

where $x$ is at least 1.

As used herein, polyenes and polyynes refer to simple or complex species of alkenes or alkynes having a multiplicity of pendant, terminally or near terminally positioned "reactive" carbon to carbon unsaturated functional groups per average molecule. For example, a diene is a polyene that has two "reactive" carbon to carbon double bonds per average molecule, while a diyne is a polyyne that contains in its structure two "reactive" carbon to carbon triple bonds per average molecule. Combinations of "reactive" double bonds and "reactive" triple bonds within the same molecule are also possible. An example of this is monovinylacetylene, which is a polyeneyne under our definition. For purposes of brevity, all these classes of compounds will be referred to hereafter as polyenes.

A second group of polyenes operable in the instant invention includes unsaturated polymers in which the double or triple bonds occur primarily within the main chain of the molecules. Examples include conventional elastomers (derived primarily from standard diene monomers) such as polyisoprene, polybutadiene, styrenebutadiene rubber, isobutylene-isoprene rubber, polychloroprene, styrene-butadiene-acrylonitrile rubber and the like; unsaturated polyesters, polyamides, and polyurethanes derived from monomers containing "reactive" unsaturation, e.g., adipic acid-butenediol, 1,6-hexanediamine-fumaric acid and 2,4-tolylene diisocyanate-butenediol condensation polymers and the like.

A third group of polyenes operable in this invention includes those polyenes in which the reactive unsaturated carbon to carbon bonds are conjugated with adjacent unsaturated groupings. Examples of operable reactive conjugated ene systems include, but are not limited to, the following:

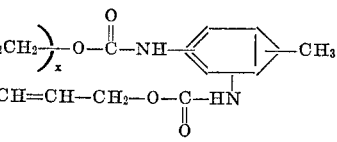

A few typical examples of polymeric polyenes which contain conjugated reactive double bond groupings such as those described above are polyethyleneether glycol diacrylate having a molecular weight of about 750, polytetramethyleneether glycol dimethacrylate having a molecular weight of about 1175, the thiacrylate of the reaction product of trimethylolpropane with 20 moles of ethylene oxide and the like.

As used herein for determining the position of the reactive functional carbon to carbon unsaturation, the term "terminal" means that said functional unsaturation is at an end of the main chain in the molecule; whereas by "near terminal" is meant that the functional unsaturation is not more than 16 carbon atoms away from an end of the main chain in the molecule. The term "pendant" means that the reactive carbon to carbon unsaturation is located terminally or near terminally in a branch of the main chain as contrasted to a position at or near the ends of the main chain. For purposes of brevity all of these positions will be referred to generally as "terminal" unsaturation.

The polyenes operable in the instant invention contain one or more of the following types of non-aromatic "reactive" carbon to carbon unsaturation:

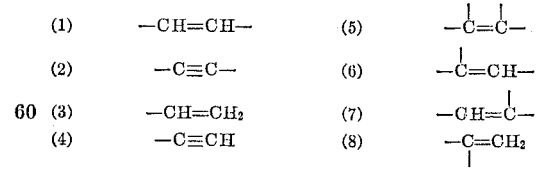

These functional groups as shown in 1–8 supra are situated in a position either which is pendant, terminal or near terminal with respect to the main chain.

On the average, the polyenes operable herein must contain 2 or more "reactive" unsaturated carbon to carbon bonds/molecule and have a viscosity in the range from 0–20 million centipoises at 130° C. Included in the term "polyenes" as used herein are those materials which in the presence of an inert solvent, aqueous dispersion or plasticizer fall within the viscosity range set out above at 130° C. Operable polyenes in the instant invention have molecular weights in the range 54 to 20,000, preferably 500 to 10,000.

As used herein the term "reactive" unsaturated carbon to carbon groups means groups having the structures as shown in 1–8 supra which will react under proper conditions as set forth herein with thiol groups to yield the thioether linkage

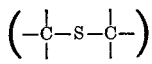

as contrasted to the term "unreactive" carbon to carbon unsaturation which means

groups when found in aromatic nucleii (cyclic structures exemplified by benzene, pyridine, anthracene, tropolone and the like) which do not under the same conditions react with thiols to give thioether linkages. In the instant invention, products from the reaction of polyenes with polythiols which contain 2 or more thiol groups per average molecule are called polythioether polymers or polythioethers.

As used herein, the term polythiols refers to simple or complex organic compounds having a multiplicity of pendant or terminally positioned —SH functional groups per average molecule.

On the average, the polythiols must contain 2 or more —SH groups/molecule. They usually have a viscosity range of 0–20 million centipoises (cps.) at 70° C. as measured by a Brookfield Viscometer. Included in the term "polythiols" as used herein are those materials which in the presence of an inert solvent aqueous dispersion or plasticizer fall within the viscosity range set out above at 70° C. Operable polythiols in the instant invention usually have molecular weights in the range 94 to 20,000, preferably 100 to 10,000.

The polythiols operable in the instant invention can be exemplified by the general formula: $R_8(SH)_n$ where $n$ is at least 2 and $R_8$ is a polyvalent organic moiety free from reactive carbon to carbon unsaturation. Thus $R_8$ may contain cyclic groupings and minor amounts of hetero atoms such as N, S or O but primarily contains carbon-hydrogen, carbon-oxygen or silicon-oxygen containing chain linkages free of any reactive carbon to carbon unsaturation.

One class of polythiols operable with polyenes in the instant invention to obtain essentially odorless polythioether products are esters of thiol-containing acids of the general formula: HS—$R_9$—COOH where $R_9$ is an organic moiety containing no "reactive" carbon to carbon unsaturation with polyhydroxy compounds of the general structure: $R_{10}(OH)_n$ where $R_{10}$ is an organic moiety containing no "reactive" carbon to carbon unsaturation and $n$ is 2 or greater. These components will react under suitable conditions to give a polythiol having the general structure:

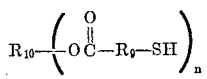

where $R_9$ and $R_{10}$ are organic moieties containing no "reactive" carbon to carbon unsaturation and $n$ is 2 or greater.

Certain polythiols such as the aliphatic monomeric polythiols (ethane dithiol, hexamethylene dithiol, decamethylene dithiol), tolyene-2,4-dithiol, etc., and some polymeric polythiols such as a thiol-terminated ethylcyclohexyl dimercaptan polymer, etc., and similar polythiols which are conveniently and ordinarily synthesized on a commercial basis, although having obnoxious odors, are operable in this invention but many of the end products are not widely accepted from a practical, commercial point of view. Examples of the polythiol compounds preferred for this invention because of their relatively low odor level include but are not limited to esters of thioglycolic acid (HS—$CH_2COOH$), α-mercaptopropionic acid (HS—CH($CH_3$)—COOH) and β-mercaptopropionic acid (HS—$CH_2CH_2COOH$) with polyhydroxy compounds such as glycols, triols, tetraols, pentaols, hexaols, etc. Specific examples of the preferred polythiols include but are not limited to ethylene glycol bis (thioglycolate), ethylene glycol bis(β-mercaptopropionate), trimethylolpropane tris (thioglycolate), trimethylolpropane tris(β-mercaptopropionate), pentaerythritol tetrakis (thioglycolate) and pentaerythritol tetrakis(β-mercaptopropionate), all of which are commercially available. A specific example of a preferred polythiol is pentaerythritol tetrakis(β-mercaptopropionate) which is prepared from pentaerythritol and β-mercaptopropionic acid by esterification.

The preferred polythiol compounds are characterized by a low level of mercaptan-like odor initially, and after reaction, give essentially odorless polythioether end products which are commercially attractive and practically useful resins or elastomers for both indoor and outdoor applications.

As used herein, the term "curable composition" means a composition having a viscosity in the range 0–20 million centipoises at 130° C. which is rapidly crosslinked on addition of the photosensitizer in combination with the synergistic agents disclosed herein under ambient conditions on exposure to a free radical generator, e.g., UV light.

The term "functionality" as used herein refers to the average number of ene or thiol groups per molecule in the polyene or polythiol, respectively. For example, a triene is a polyene with an average of three "reactive" carbon to carbon unsaturated groups per molecule and thus has a functionality ($f$) of three. A polymeric dithiol is a polythiol with an average of two thiol groups per molecule and thus has a functionality ($f$) of two.

It is further understood and implied in the above definitions that in these systems the functionality of the polyene and polythiol component is commonly expressed in whole numbers although in practice the actual functionality may be fractional. For example, a polyene component having a nominal functionality of 2 (from theoretical considerations alone) may in fact have an effective functionality of somewhat less than 2. In an attempted synthesis of a diene from a glycol in which the reaction proceeds to 100% of the theoretical value for complete reaction, the functionality (assuming 100% pure starting materials) would be 2.0. If, however, the reaction were carried to only 90% of theory for complete reaction, about 10% of the molecules present would have only one ene functional group, and there may be a trace of material that would have no ene functional groups at all. Approximately 90% of the molecules, however, would have the desired diene structure and the product as a whole then would have an actual functionality of 1.9. Such a product is useful in the instant invention and is referred to herein as having a functionality of 2.

The aforesaid polyenes and polythiols can, if desired, be formed or generated in situ and still be rapidly cured by the process of the instant invention.

To obtain the maximum strength, solvent resistance, creep resistance, heat resistance and freedom from tackiness, the reaction components consistings of the polyenes and polythiols of this invention are formulated in such a manner as to give solid, cross-linked, three dimensional network polythioether polymer systems on curing. In order to achieve such infinite network formation, the individual polyenes and polythiols must each have a functionality of at least 2 and the sum of the functionalities of the polyene and polythiol components must always be greater than 4. Blends and mixtures of the polyenes and the polythiols containing said functionality are also operable herein.

The compositions to be cured, i.e. (converted to solid resins or elastomers) in accord with the present invention may, if desired, include such additives as antioxidants, dyes, inhibitors, fillers, pigments, anti-static agents, flame-retardant agents, thickeners, thixotropic agents, surface-active agents, viscosity modifiers, extending oils, plasticizers, tackifiers and the like within the scope of this invention. Such additives are usually pre-blended with the polyene or polythiol prior to or during the compounding step. Operable fillers include natural and synthetic resins, carbon black, glass fibers, wood flour, clay, silica, alumina, carbonates, oxides, hydroxides, silicates, glass flakes, glass beads, borates, phosphates, diatomaceous earth, talc, kaolin, barium sulfate, calcium sulfate, calcium carbonate, antimony oxide and the like. The aforesaid additives may be present in quantities up to 500 parts or more per 100 parts polymer by weight and preferably 0.005–300 parts on the same basis.

In all the curable systems herein, the compositions consist of 2–98 parts by weight of a polyene containing at least 2 reactive unsaturated carbon to carbon bonds per molecule, 98–2 parts by weight of a polythiol containing at least 2 thiol groups per molecule, 0.001 to 1 part by weight of the phosphine or phosphite synergistic agent and 0.0005 to 25 parts by weight of a photosensitizer.

Various photosensitizers are operable and well known to those skilled in the art. Examples of photosensitizers include, but are not limited to benzophenone, acetophenone, acenaphthene-quinone, methyl ethyl ketone, valerophenone, hexanophenone, α-pnenylbutyrophenone, p-morpholinopropionphenone, dibenzosuberone, 4-morpholinobenzophenone, 4'-morpholinodeoxybenzoin, p-diacetylbenzene, 4-aminobenzophenone, 4'-methoxyacetophenone, benzaldehyde, α-tetralone, 9-acetylphenanthrene, 2 - acetylphenanthrene, 10 - thioxanthenone, 3 - acetylphenanthrene, 3 - acetylindole, 9 - fluoroenone, 1-indanone, 1,3,5 - triacetylbenzene, thioxanthen-9-one, xanthene-9-one, 7-H-benz[de]anthracen-7-one, 1-naphthaldehyde, 4,4'-bis(dimethylamino) benzophenone, fluorene-9-one, 1'-acetonaphthone, 2'-acetonaphthone and 2,3-butanedione, etc., which serve to give greatly reduced exposure times and thereby when used in conjunction with various forms of actinic radiation yield very rapid, commercially practical time cycles by the practice of the instant invention. The photosensitizers are usually added in an amount ranging from 0.0005 to 25 parts by weight, suitably 0.0005 to 15 parts by weight, preferably 0.001 to 10 parts by weight of the photocurable composition.

The compounding of the components prior to curing can be carried out in several ways. For example, the combination of a synergistic agent and photosensitizer can be dissolved in the polyene at ambient temperature or at elevated temperatures up to about 110° C. then cooled to room temperature whereas the polythiol can be added to the system prior to curing. Another method of compounding is to dissolve the synergistic combination in an inert solvent, e.g., ethyl alcohol, admix the solution in the polyene, pull off the solvent under vacuum and then add the polythiol. Still another method is to dissolve the synergistic combination of a plasticizer, e.g., "Benzoflex 9-88" commercially available from Carlisle Chemical Corporation, which is thereafter admixed in the polyene followed by admixing the polythiol into the system. Another method of compounding the components is to admix the phosphine or phosphite synergistic agent with the polythiol at temperatures ranging from ambient up to 100° C. and then cool to room temperature whereat the polyene containing a photosensitizer can be added to the system prior to curing . Yet another method is to add the synergistic combination of photosensitizer and synergistic agent to the polyene/polythiol composition at ambient or elevated temperatures prior to curing. In all cases, for the best results, it is preferred to avoid extended periods at elevated temperatures while compounding. Additionally, to insure that pre-curing does not occur, the polythiol is generally the final component compounded into the curing system or commercially available stabilizers are added to the system.

The following examples will aid in explaining, but should not be deemed as limiting the instant invention. In all cases, unless otherwise noted, all parts and percentages are by weight.

FORMATION OF POLYENE PREPOLYMER

Example 1

A round bottom flask is fitted with a stirrer, thermometer, dropping funnel, nitrogen inlet and outlet and placed in a heating mantle or immersed in a water bath as required.

To the flask was added two moles (428 g.) of trimethylolpropane diallyl ether mixed with 0.2 cc. of dibutyl tin dilaurate under nitrogen. One mole of tolylene-2,4-diisocyanate was added to the mixture, using the rate of addition and cooling water to keep the temperature under 70° C. The mantle was used to keep the temperature at 70° C. for another hour. Isocyanate analysis showed the reaction to be essentially complete at this time. 602 g. of the tetraene product was obtained and will be referred to hereinafter as Prepolymer A.

Example 2

To a thoroughly dry 2 liter resin kettle equipped with stirrer, allihn (bubble) condenser, thermometer and pressure equalizing dropping funnel was added 4 moles of tolylene-2,4-diisocyanate. The flask was put under a nitrogen blanket and heated to 60° C. with stirring. 8 moles of allyl alcohol was added from the dropping funnel over a 2-hour period while the flask was maintained at a temperature of 60–70° C. After completion of the addition of the allyl alcohol, the reaction was maintained at 60–70° C. with stirring for an additional 2 hours at which time the isocyanate analysis showed the reaction to be essentially complete. 1160 g. of the diene product was obtained and will be referred to hereinafter as Prepolymer B.

Example 3

To a round-bottom flask is added 160 g. (4.0 moles) of sodium hydroxide dissolved in 560 g. of water, 150 ml. of methanol, and 456 g. (2.0 moles) of bisphenol A (Shell Chemical Company). The resulting slurry is heated to reflux (78° C.) with stiring and 306 g. (4.0 moles) of allyl chloride is added from a dropping funnel over 0.5 hour. The mixture is heated at reflux with stirring for an additional 4 hours. To the mixture 700 g. of water is added and the methanol is removed by distillation. The reaction product is cooled and the aqueous phase is separated. The organic phase is mixed with a large volume of acetone, filtered and evaporated on a rotary vacuum dryer at 90° C. (max.) and 2 mm. Hg (min.). 565 g. of the polyene product was obtained and will be referred to hereinafter as Prepolymer C.

Example 4

1 mole diglycidyl ether of bisphenol A having a molecular weight in the range 370–384 and being commercially available from Shell Chemical Company under the trade name "Epon 828" and 2 moles of diallyl amine were dissolved in 500 ml. benzene in a beaker at room temperature (25° C.). The reaction was continued with stirring for 18 hours during which time reaction temperature was maintained below 80° C. The benzene solvent was removed by vacuum. 580 g. of the tetraene product was obtained and will be referred to hereinafter as Prepolymer D.

Example 5

458 g. (0.23 mole) of a commercially available liquid polymeric diisocyanate sold under the trade name "Adiprene L–100" by E. I. du Pont de Nemours & Company, was charged to a dry resin kettle maintained under a nitrogen atmosphere and equipped with a condenser, stirrer, thermometer and gas inlet and outlet. 37.8 g. (0.65 mole) of allyl alcohol was charged to the kettle and the reaction was continued for 17 hours with stirring at 100° C. Thereafter the nitrogen atmosphere was removed and the kettle was evacuated 8 hours at 110° C. 50 cc. dry benzene was added to the kettle and the reaction product was azeotroped with benzene to remove the unreacted alcohol. This allyl terminated liquid prepolymer had a molecular weight of approximately 2100 and will be referred to as Prepolymer E hereinafter.

Example 6

400 g. (0.2 mole) of "Adiprene L-100" was charged to a dry resin kettle maintained under nitrogen and equipped with a condenser, stirrer, thermometer and gas inlet and outlet. 25.2 g. (0.43 mole) of propargyl alcohol

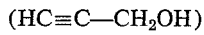

$$(HC\equiv C-CH_2OH)$$

was added to the kettle and the reaction was continued with stirring for 18 hours at 160° C. Thereafter the nitrogen atmosphere was removed and the kettle was evacuated 16 hours at 100° C. followed by azeotropic distillations with 50 cc. water and then 50 cc. benzene to remove any excess propargyl alcohol. This $HC\equiv C-$ terminated liquid prepolymer had a viscosity of 27,500 centipoises at 70° C. and a molecular weight of 2100 and will be referred to as Prepolymer F hereinafter.

Example 7

1 mole of commercially available polyethylene glycol having a molecular weight of 1450 and a specific gravity of 1.21 was charged to resin kettle maintained under nitrogen and equipped with a condenser, stirrer, thermometer and a gas inlet and outlet. 2.9 g. dibutyl tin dilaurate as a catalyst was charged to the kettle along with 2 moles tolylene-2,4-diisocyanate and 2 moles of allyl alcohol. The reaction was continued with stirring at 60° C. for 2 hours. Therafter a vacuum of 1 mm. was applied for 2 hours at 60° C. to remove the excess alcohol. This $CH_2=CH-$ terminated prepolymer had a molecular weight of approximately 1950 and will hereinafter be referred to as Prepolymer G.

Example 8

1 mole of a commercially available polyoxypropylene glycol having a molecular weight of about 1958 and a hydroxyl number of 57.6 was charged to a resin kettle equipped with a condenser, stirrer, thermometer and a gas inlet and outlet. 4 g. of dibutyl tin dilaurate as a catalyst was added to the kettle along with 348 g. (2.0 moles) of tolylene-2,4-diisocyanate and 116 g. (2 moles) of allyl alcohol. The reaction was carried out for 20 minutes at rom temperature under nitrogen. Excess alcohol was stripped from the reaction kettle by vacuum over a one hour period. The thus formed $CH_2=CH-$ terminated liquid prepolymer had a molecular weight of approximately 2400 and will be referred to as Prepolymer H.

Example 9

750 g. of a N-containing tetrol (hydroxyl functionality=4) available from Wyandotte Chemicals Corporation under the trade name "Tetronic Polyol 904" having a M.W. of 7,500 was placed in a reaction vessel heated at 110° C. The flask was maintained under vacuum for one hour. Then, under an atmosphere of nitrogen, 0.1 cc. dibutyl tin dilaurate was added and the flask was cooled to 50° C. Now 18.3 g. allyl isocyanate was added slowly, maintaining the temperature at about 95° C. for about one hour after the addition was completed. The thus formed polymeric polyene (i.e., Prepolymer I hereinafter) had a theoretical allyl functionality of 2.2, a theoretical hydroxyl functionality of 1.8, and a calculated molecular weight of about 7,683.

Example 10

To a resin kettle maintained under a nitrogen atmosphere and equipped with a condenser, stirrer, thermometer and gas inlet and outlet was added 843 g. of a commercially available liquid diisocyanate prepolymer sold under the trade name "Multrathane F-196" by Mobay Chemical Company, said prepolymer having a molecular weight of about 1680 and an available isocyanate content of 4.7–5.2%. 87 g. (1.5 moles) of allyl alcohol was added to the kettle and the reaction was continued for 18 hours at 140° C. with stirring. Thereafter the nitrogen atmosphere was removed and the kettle was evacuated for 22 hours at 100° C. 50 cc. of dry benzene was added to the kettle and the reaction product was azeotroped therewith to remove any unreacted alcohol. This $CH_2=CH-$ terminated liquid prepolymer had a viscosity of 25,000 centipoises at 70° C. and a molecular weight of approximately 1800 and will be referred to as Prepolymer J hereinafter.

Example 11

678 g. (0.34 mole) of a commercially available polyoxypropylene glycol sold under the trade name NIAX by Union Carbide Company and having a molecular weight of about 2035 was degassed for 2 hours at 100° C. and thereafter charged to a resin kettle maintained under a nitrogen atmosphere and equipped with a condenser, stirrer, thermometer and gas inlet and outlet. 118 g. (0.68 mole) of tolylene 2,4-diisocyanate was charged to the kettle and the reaction was heated with stirring for 2¾ hours at 120° C. After cooling, 58 g. (1.0 mole) of allyl alcohol was added to the kettle and the mixture was refluxed at 120° for 16 hours under nitrogen. Excess allyl alcohol was removed overnight by vacuum at 100° C. The allyl terminated liquid prepolymer having a viscosity of 19,400 cps. at 30° C. as measured on a Brookfield Viscometer was removed from the kettle and will be referred to hereinafter as Prepolymer K.

Example 12

751 g. (0.38 mole) of a commercially available polyoxypropylene glycol sold under the trade name "Pluracol P 2010" by Wyandotte Chemical Company was degassed at room temperature for 3 hours and then charged to a dry resin kettle maintained under a nitrogen atmosphere and equipped with a condenser, stirrer, thermometer and gas inlet and outlet. 132 g. (0.76 mole) of tolylene-2,4-diisocyanate was charged to the kettle and the kettle was heated for 2 hours at 120° C. with stirring under nitrogen. After cooling, 58 g. (1.0 mole) of allyl alcohol was added and the mixture was refluxed at 120° C. overnight. Excess allyl alcohol was stripped by vacuum overnight at 120° C. The thus formed allyl terminated liquid prepolymer had a viscosity of 1500 cps. as measured on a Brookfield Viscometer at 70° C. and a molecular weight of approximately 2500 and will hereinafter be referred to as Prepolymer L.

Example 13

To a one liter resin kettle equipped with stirrer, thermometer, gas inlet and outlet and heated to a temperature of 50° C. was charged 610 g. (0.2 mole) of polytetramethylene ether glycol, commercially available from Quaker Oats Company and having a hydroxyl number of 37.1 along with 0.3 g. dibutyl tin dilaurate. The temperature of the kettle was raised to 110° C. and the contents were freed of water under 1 millimeter vacuum for one hour. The resin kettle was cooled to 60° C. and the system was placed under a protective atmosphere of nitrogen throughout the remainder of the reaction. 25.2 g. of allyl isocyanate, (0.4 mole) was added dropwise to the kettle at such a rate as to maintain the temperature at 50° C. When the NCO content dropped to 0.54 mg./g., 1 mm. vacuum again was applied and the system was heated at 70° C. for one hour. The thus formed polymer product (Prepolymer M) was a solid at room temperature, but at 50° C. is clear and pourable. The polymer product had a viscosity of 1,800 centipoises at 70° C. as measured on a Brookfield Viscometer and an average molecular weight of approximately 3200.

Example 14

To a one liter resin kettle equipped with stirrer, thermometer, gas inlet and outlet was charged 591 g. (0.30 mole) of a polyoxypropylene glycol commercially available from Union Carbide under the trade name "PPG 2025" and 0.3 g. of dibutyl tin dilaurate. The kettle was heated to 110° C. and the contents were freed of water under 1 mm. vacuum for one hour. The kettle was cooled to 25° C. and the system was placed under a protective atmosphere of nitrogen throughout the remainder of the reaction. 53.1 ml. (49.8 g., 0.6 mole) of allyl isocyanate commercially available from Chemetron Corporation was added to the system. An exotherm carried the temperature to 45° C. in 22 minutes. After 60 minutes, the NCO content (as determined by titration) was 0.04 mg./g. The system was placed under one mm. vacuum and heated to 70° C. to remove traces of unreacted allyl isocyanate. The resultant polymer product (Prepolymer N) had a viscosity of 600 centipoises at 30° C. as measured on a Brookfield Viscometer and an average molecular weight of approximately 2200.

Example 15

To a liter flask equipped with stirrer, thermometer, and gas inlet and outlet were charged 450 g. (0.45 mole) of poly(tetramethylene ether) glycol having a hydroxyl number of 112 and a molecular weight of 1000, along with 900 g. (0.45 mole) of poly(tetramethylene ether) glycol having a hydroxyl number of 56 and a molecular weight of 2000, both commercially available from Quaker Oats Company. The flask was heated to 110° C. under vacuum and nitrogen and maintained thereat for one hour. The flask was then cooled to approximately 70° C. whereat 0.1 g. of dibutyl tin dilaurate was added to the flask. A mixture of 78 g. (0.45 mole) of tolylene diisocyanate and 78 g. (0.92 mole) of allyl isocyanate was thereafter added to the flask dropwise with continuous stirring. The reaction was maintained at 70° C. for one hour after addition of all the reactants. The thus formed allyl terminated prepolymer will hereinafter be referred to as Prepolymer O.

Example 16

In a one liter, 4-neck flask, 220 g. of hexol commercially available from Union Carbide Chemicals Company under the trade name "NIAX Polyol LS-490" (0.32 mole) and 0.1 cc. of dibutyl tin dilaurate was heated to 110° C. under vacuum for one hour. After cooling in nitrogen to approximately 60° C., 80 g. of allyl isocyanate was added to the flask by means of a dropping funnel. The exothermic reaction produced a 100° C. temperature. When the addition was complete, the reaction was continued at 70° C. for one hour. The resulting triene polymer product (Prepolymer P) had an average molecular weight of approximately 950 and a viscosity of 300 centipoises as measured on a Brookfield Viscometer at 70° C.

Example 17

To a one liter 4-neck flask was charged 300 g. of a polyester diol (molecular weight 3232) sold under the trade name "RC Polyester S 101-35" by R. C. Division, Hooker Chemical Corporation and 0.1 cc. of dibutyl tin dilaurate. The flask was heated to 110° C. under vacuum and maintained thereat for one hour. The flask was cooled to approximately 60° C., nitrogen was admitted, and 7.7 g. allyl isocyanate and 8.1 g. of tolylene-2,4-diisocyanate was added by means of a dropping funnel to the reaction at a moderate rate. A maximum temperature of 90° C. was noted. When the addition was complete, the reaction was allowed to continue at 70° C. for one hour. The thus formed solid polymeric product (Prepolymer Q) had an average molecular weight of approximately 6800 and a viscosity of 13,600 centipoises when measured on a Brookfield Viscometer at 70° C.

Example 18

To a one liter 4-neck flask heated at 110° C. was charged 808 g. of a polyester diol (having a molecular weight 3232) sold under the trade name "RC Polyester S 101-35" by R. C. Division Hooker Chemical Corporation and 0.1 cc. dibutyl tin dilaurate. The flask was maintained under vacuum at 110° C. for one hour. The flask was cooled to approximately 50° C. and with nitrogen passing through, a mixture of 10 g. of allyl alcohol and 60 g. of tolylene-2,4-diisocyanate was added via a dropping funnel at a moderate rate. The reaction was allowed to continue for 15 minutes. A maximum temperature of 90° C. was produced by the exothermic reaction. The polymeric product obtained was a solid at room temperature but liquid at 70° C. The product (Prepolymer R) had an average molecular weight of approximately 10,500 and a viscosity of 270,000 centipoises at 70° C.

Example 19

500 g. of stabilized Prepolymer A from Example 1, 420.6 g. of pentaerythritol tetrakis (β-mercaptopropionate) commercially available from Carlisle Chemical Company under the trade name "Q–43" and 7.5 g. of benzophenone were heated to 60° C. and admixed homogeneously. This master batch will be used to show the synergistic effects afforded by the phosphines and phosphites synergistic agents in the following examples.

Example 20

5 g. of the polyene, polythiol, photosensitizer admixture from Example 19 were admixed with 0.075 g. triphenylphosphine. The admixture was poured into an aluminum dish (2 millimeters thick layer) and exposed to UV radiation (3000–4000 A. wave length) from a 275 watt Westinghous sunlamp delivering 4000 microwatts/cm.$^2$ at the surface of the layer. In 3 seconds the layer was cured to a solid on its surface (skin cure) and in 13 seconds the admixture was cured to a solid clear through. A control run of a 2 millimeter thick layer of the master batch of Example 19 without any triphenylphosphine present required 9 seconds for a skin cure and 45 seconds for a clear through cure under the same radiation conditions.

The following examples set out in Table I show the operability of various phosphines and phosphites to accelerate the curing of the polyene/polythiol reaction. In all examples, 5 g. of the polyene, polythiol and photosensitizer admixture from Example 19 were admixed with the various synergistic agents in the amount shown and poured into an aluminum dish to form a layer 2.0 millimeters thick. The layer was exposed to UV radiation (3000–4000 A. wave length) from a 275 watt Westinghouse sunlamp situated to deliver 4000 microwatts/cm.$^2$ at the surface of the layer. The various times to cure the surface (skin cure) and to cure clear through to a solid are shown in Table I. The control run using the admixture of Example 19 without any synergistic agent being present required 9 seconds for a skin cure and 45 seconds for a clear through cure (2 millimeters). As can be seen from the results, the addition of the phosphine or phosphite synergistic agent decreased the curing time up to 70%.

TABLE I

| Ex. No. | Synergistic agent | Form | Amount, percent [a] | Sunlamp cures (seconds) | |
|---|---|---|---|---|---|
| | | | | Skin | Clear through |
| 21 | None (control) | | | 9 | 45 |
| 22 | Triphenylphosphine | Solid | 0.15 | 3 | 13 |
| 23 | do | do | .05 | 3 | 15 |
| 24 | Ethylenebis (diphenylphosphine) | do | .15 | 3 | 13 |
| 25 | do | do | .05 | 3 | 12 |
| 26 | Diphenyl-p-tolylphosphine | do | .15 | 3 | 13 |
| 27 | do | do | .05 | 3 | 12 |
| 28 | Tri-n-octylphosphine | Liquid | .15 | 3 | 14 |
| 29 | do | do | .05 | 3 | 13 |
| 30 | Tri-o-tolylphosphine | Solid | .15 | 3 | 18 |
| 31 | do | do | .05 | 5 | 25 |
| 32 | Methoxydiphenylphosphine | Liquid | .15 | 4 | 18 |
| 33 | do | do | .05 | 4 | 16 |
| 34 | n-Butoxydiphenylphosphine | do | .15 | 4 | 23 |
| 35 | Di-n-butoxyphenylphosphine | do | .15 | 5 | 18 |
| 36 | Triphenyl phosphite | do | .05 | 6 | 35 |
| 37 | Triisooctyl phosphite | do | .15 | 8 | 37 |

[a] Weight percent based on the weight of the polyene/polythiol.

The following examples set out in Table II show the operability of various phosphines and phosphites in varying amounts to accelerate the curing of the polyene/polythiol reaction. In all examples, 5 g. of the polyene, polythiol and photosensitizer admixture from Example 19 were admixed with the various synergistic agents in the amount shown and placed in an oven for one half hour at 60° C. The admixtures were then poured into aluminum dishes to form a layer 2.0 millimeters thick. The layers were exposed to UV radiation (3000–4000) A. wave length) from a 275 watt Westinghouse sunlamp situated to deliver 4000 microwatts/cm.[2] at the surface of the layer. Cure times are shown in Table II with the control (without any synergistic agent) requiring 8 seconds for a skin cure and 30 seconds for a clear through cure (2 millimeters).

TABLE II

| Ex. No. | Synergistic agent | Amount, percent [a] | Sunlamp cures (section) | |
|---|---|---|---|---|
| | | | Skin | Clear through |
| 38 | None (control) | | 8 | 30 |
| 39 | Triphenylphosphine | 0.15 | 3 | 11 |
| 40 | do | 0.01 | 4 | 13 |
| 41 | Triisoocty phosphite | 0.30 | 5 | 18 |
| 42 | do | 0.50 | 4 | 14 |
| 43 | Tri-p-tolyl phosphite | 0.20 | 8 | 20 |
| 44 | Triallyl phosphite | 0.40 | 7 | 20 |

[a] Weight percent based on weight of polyene/polythiol.

The following examples in Table III show the operability of the invention with various polyenes with a different polythiol, i.e., tetrakis(3-mercaptopropyl) ether of pentaerythritol. The method for making this polythiol is shown in a commonly assigned application having Ser. No. 78,625 filed Oct. 6, 1970. The method is as follows.

In a Pyrex tube (10" long and 2" wide) were placed a stirring bar magnet, 59.2 g. (0.2 M) tetrallyl ether of pentaerythritol and 76.0 g. (1 M) thioacetic acid. A low pressure mercury lamp enclosed in a quartz tube (about 1" in diameter) was then immersed in the stirred mixture. The mixture was irradiated with this lamp for 2 hours, when a yellowish, viscous liquid material was obtained. Excess thioacetic acid was removed by distillation and the residue heated to 140° C. at 0.5 mm. of Hg. After cooling, the yellow liquid was decolorized with charcoal. The weight of the addition product, i.e., pentaerythritol tetrakis(3-thioacetoxypropyl) ether was 102.7 g. (86% of theory). All of the liquid tetrakis thioacetate addition product was placed in a one liter, 3-neck round bottom flask equipped with mechanical stirrer and reflux condenser. An aqueous solution of sodium hydroxide (60 g. in 180 ml. of H$_2$O) was added and the mixture heated with stirring for 5 hours. After cooling to room temperature, the reaction mixture was acidified with hydrochloric acid to pH 6–6.5 and extracted with 500 ml. of diethyl ether and the ether layer separated. Ether was removed by distillation and the residue (liquid) was heated to 125° C. at 0.5 mm. of Hg to remove any volatile materials that might be present. The colorless liquid residue on cooling was weighed and stored under nitrogen. The yield was 68.5 g. (95% of theory) of tetrakis(3-mercaptopropyl) ether of pentaerythritol.

In all examples in Table III, the polyene, polythiol, photosensitizer and synergistic agent were admixed together and heated at 70° C. for 30 minutes with intermittent stirring to obtain a homogeneous mixture. The admixture was then poured into a glass mold to form a layer 20 mils thick. The layer was exposed to UV radiation (3000–4000 A. wave length) from a 275 watt Westing house sunlamp delivering 4000 microwatts/cm.[2] at the surface of the admixture layer. Cure times are shown in Table III.

TABLE III

| Ex. No. | Polyene | | Polythiol [b] (grams) | Photosensitizer [c] (milligrams) | Triphenylphine (grams) | Curing time (seconds) | |
|---|---|---|---|---|---|---|---|
| | Prepolymer [a] | Grams | | | | Skin | Clear through |
| 45 | A | 7.5 | 5.4 | 80 | 0 | 10 | 600 |
| 46 | A | 7.5 | 5.4 | 80 | 0.05 | 5 | 20 |
| 47 | B | 7.25 | 5.4 | 80 | 0 | 30 | 240 |
| 48 | B | 7.25 | 5.4 | 80 | 0.045 | 15 | 40 |
| 49 | C | 14.45 | 10.8 | 160 | 0 | ---- | 180 |
| 50 | C | 14.45 | 10.8 | 160 | 0.13 | ---- | 90 |
| 51 | D | 14.45 | 10.8 | 160 | 0 | ---- | 60 |
| 52 | D | 14.45 | 10.8 | 160 | 0.13 | ---- | 45 |

[a] Prepolymer A-D taken from Examples 1–4 respectively.
[b] Tetrakis (3-mercaptopropyl) ether of pentaerythritol.
[c] Benzophenone.

Another method of measuring the acceleration effect of the synergistic agents of the instant invention is by measuring the resultant hardness of the cured sample with and without any synergistic agent after a set curing period as shown in the following example.

Example 53

7.5 g. of stabilized Prepolymer A from Example 1 were admixed with 0.253 g. benzophenone and 7.5 g. of trimethylolpropane tris(β-mercaptopropionate) commercially available from Carlisle Chemical Company under the trade name "P–33" and poured into a mold to a thickness of 40 mils. The admixture was exposed for 2 minutes to UV radiation from a 275 watt Westinghouse sunlamp (3000–4000 A. wave length) delivering 4000 microwatts/cm.[2] at the surface of the admixture. The admixture had only a skin cure after exposure and no Shore A hardness could be measured at the bottom of the layer. The example was repeated except that 0.303 g. triphenyl phosphine was added to the admixture homogeneously prior to the 2 minute exposure. The resultant cured solid polythioether product had a Shore A hardness of 78 at the bottom of the layer.

Example 54

150 g. of Prepolymer O from Examples 15, 12.2 g. of pentaerythritol tetrakis (β-mercaptopropionate) commercially available from Carlisle Chemical Company under the trade name "Q-43" were heated to 60° C. and admixed homogeneously. The following examples in Table IV, using the aforesaid polyene/polythiol admixture, show the synergistic effect of the photosensitizer and synergistic agent as compared to either per se. In all examples in Table IV, the compositions were poured into an aluminum dish (2 millimeters thick layer) and exposed to UV radiation (3000–4000 A. wave length) from a 275 watt Westinghouse sunlamp delivering 4000 microwatts/cm.² at the surface of the layers for various times necessary to obtain a skin cure.

TABLE IV

| Ex. No. | Benzophenone, percent [a] | Triphenylphosphine, percent [a] | Skin curing time (seconds) |
|---|---|---|---|
| 55 | 0 | 1.5 | 50 |
| 56 | 1.5 | 0 | 14 |
| 57 | 1.5 | 1.5 | 7 |

[a] Weight percent based on the weight of the polyene/polythiol composition of Example 54.

The solid cured polythioether polymer products resulting from the instant invention have many and varied uses. Examples of some uses include, but are not limited to, adhesives, caulks, elastomeric sealants, liquid castable elastomers, thermoset resins, laminating adhesives, coatings, mastics and the like.

The curable polymer compositions containing the synergistic combinations of the instant invention prior to curing can be pumped, poured, brushed, sprayed, doctored, rolled, trowelled, dipped-coated, extruded or gunned into place into cavities, into molds, or onto vertical or horizontal surfaces in a uniform fashion. Following such application curing in place to a solid resin or an elastomer can be made to occur very rapidly. The compositions can be applied to various substrates and adhere well to glass, wood, metals, concrete, certain plastics, paints, enamels, fabrics, paper, paper board, porcelain, ceramics, brick, cinder block and plaster.

The liquid polythioether-forming components and compositions of the instant invention can, prior to curing, be admixed with or blended with other monomeric and polymeric materials such as thermoplastic resins, elastomers or thermosetting monomeric or polymeric resin compositions. The resulting blend can be subjected to conditions for curing or co-curing of the various components of the blend to give cured products having unusual physical properties. Examples of the classes of the materials which can be admixed, blended or co-cured with the polythioether-forming compositions of the instant invention are illustrated by, but not limited to, the following: epoxy resins, phenolic resins, poly-sulfide resins, elastomers, polyurethane resins and elastomers, polyamide resins, polyvinyl chloride resins, amphorous or crystalline polyolefins, polyacrylonitrile polymers, silicone polymers, urea-formaldehyde resins, polyether resins and elastomers and the like.

Actinic radiation operable herein to effect curing is preferably UV light having a wave length in the range 3000–4000 A.

What is claimed is:
1. In a curable composition consisting essentially of (1) 2–98 parts by weight of a polyene having a viscosity in the range from 0–20 million centipoises at 130° C. and containing at least 2 unsaturated carbon to carbon bonds per molecule reactive with polythiols, (2) 98–2 parts by weight of a polythiol containing at least 2 thiol groups per molecule, the total combined functionality of (a) the unsaturated carbon to carbon bonds per molecule in the polyene and (b) the thiol groups per molecule in the polythiol being greater than 4 and (3) a benzophenone photosensitizer, the improvement comprising the presence of 0.001 to 1.0 part by weight of the composition of a synergistic agent of the formula

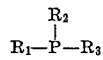

wherein $R_1$, $R_2$ and $R_3$ are each independently selected from the group consisting of alkyl, aryl, alkaryl and alkoxy, said alkyl containing 1–12 carbon atoms.

2. The composition according to claim 1 wherein the synergistic agent is a member of the group consisting of triphenylphosphine, ethylenebis (diphenylphosphine), diphenyl-p-tolylphosphine, tri-n-octylphosphine, tri-o-tolylphosphine, methoxydiphenylphosphine, n-butoxydiphenylphosphine and di-n-butoxyphenylphosphine.

3. In the process of curing a composition consisting essentially of (1) 2 to 98 parts by weight of a polyene having a viscosity in the range from 0–20 million centipoises at 130° C. and containing at least 2 unsaturated carbon to carbon bonds per molecule reactive with polythiols, (2) 98 to 2 parts by weight of a polythiol containing at least 2 thiol groups per molecule, the total combined functionality of (a) the unsaturated carbon to carbon bonds per molecule in the polyene and (b) the thiol groups per molecule in the polythiol being greater than 4 and (3) a benzophenone photosensitizer, the improvement whereby the curing is accelerated on exposure to a free radical generator which comprises adding to the composition 0.001 to 1.0 part by weight of the composition of a synergistic agent of the formula

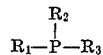

wherein $R_1$, $R_2$ and $R_3$ are each independently selected from the group consisting of alkyl, aryl, alkaryl and alkoxy, said alkyl containing 1–12 carbon atoms.

4. The process according to claim 3 wherein the synergistic agent is selected from the group consisting of triphenylphosphine, ethylenebis (diphenylphosphine), diphenyl-p-tolylphosphine, tri-n-octylphosphine, tri-o-tolylphosphine, methoxydiphenylphosphine, n-butoxydiphenylphosphine and di-n-butoxyphenylphosphine.

5. The process according to claim 3 wherein the free radical generator is UV radiation.

6. The process according to claim 5 where the UV radiation has a wave length of 3000–4000 A.

References Cited
UNITED STATES PATENTS

| | | | |
|---|---|---|---|
| 3,661,744 | 5/1972 | Kehr et al. | 204—159.14 |
| 3,666,133 | 5/1972 | Benning | 204—159.18 |
| 3,331,761 | 7/1967 | Mao | 204—159.23 |
| 3,531,282 | 9/1970 | Miller et al. | 204—159.24 |
| 3,668,093 | 6/1972 | Rettig | 204—159.23 |

JOHN C. BLEUTGE, Primary Examiner

R. B. TURER, Asistant Examiner

U.S. Cl. X.R.

117—93.31, 132 B, 132 R, 138.8 R, 148, 155; 204—159.14, 159.18, 159.23, 159.24; 260—2.5 A, 2.5 R, 17.4 R, 41 A, 41 B, 41 R, 41 AG, 63 UY, 77.5 BB, 77.5 UR, 77.5 MA, 77.5 AM, 79.5 B, 79.5 R, 79.5 NV, 833, 858, 860, 874

UNITED STATES PATENT AND TRADEMARK OFFICE
CERTIFICATE OF CORRECTION

PATENT NO. : 3,729,404
DATED : April 24, 1973
INVENTOR(S) : Charles R. Morgan

It is certified that error appears in the above-identified patent and that said Letters Patent are hereby corrected as shown below:

In Column 3, lines 24-30, please delete:

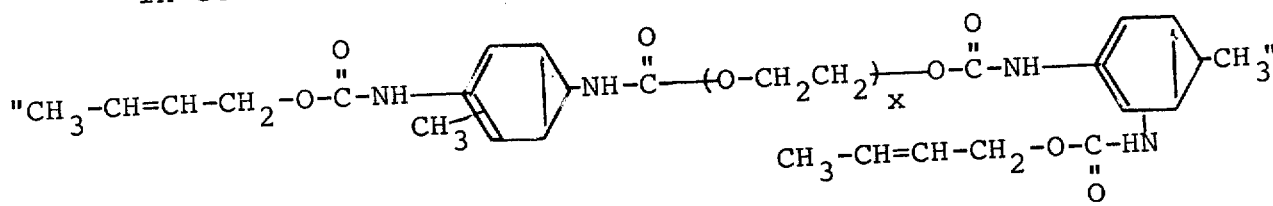

and insert therefor:

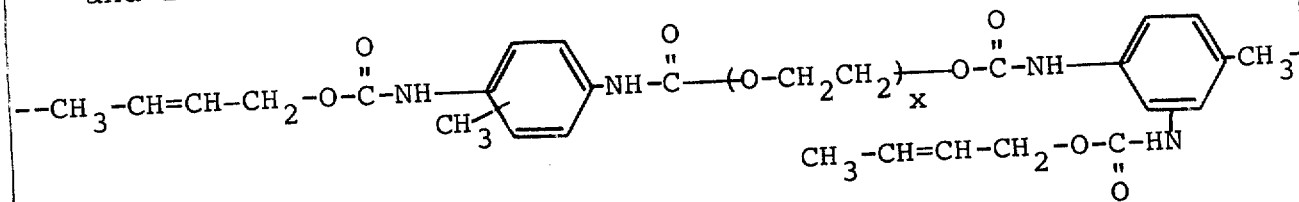

Signed and Sealed this

First Day of February 1977

[SEAL]

Attest:

RUTH C. MASON
Attesting Officer

C. MARSHALL DANN
Commissioner of Patents and Trademarks